United States Patent [11] 3,599,869

[72] Inventor Guido Oberdorfer
 Werkstrasse 22, Bellenberg, Germany
[21] Appl. No. 803,787
[22] Filed Mar. 3, 1969
[45] Patented Aug. 17, 1971

[54] CAR WASHING APPARATUS ADAPTED FOR MOUNTING ON THE VEHICLE TO BE WASHED
 5 Claims, 5 Drawing Figs.
[52] U.S. Cl. .................................................. 239/172,
 137/565, 180/1 R, 180/53 FE, 239/130, 280/5 R,
 401/40, 417/223
[51] Int. Cl. ........................................................ E01c 19/16
[50] Field of Search............................................ 180/1, 53
 FE; 401/7, 40, 41, 42, 43; 239/172, 130, 146;
 169/24; 130/23; 230/15 MC; 137/565; 280/5 A, 5

[56] References Cited
 UNITED STATES PATENTS
1,623,221 4/1927 Weimer....................... 180/53 FE
2,514,225 7/1950 Dabrohua.................... 401/43 X
2,563,981 8/1951 Walker......................... 280/5 A
2,663,890 12/1953 Sullins.......................... 401/7
2,918,011 12/1959 McCray et al. ............... 103/23
3,129,014 4/1964 Hutchison et al............. 280/5 A
3,154,086 10/1964 Barnes.......................... 137/565 X
3,171,154 3/1965 Lovell........................... 103/23 X
3,265,262 8/1966 Motsinger.................... 280/5 UX
3,317,142 5/1967 Casale.......................... 239/172 X FOREIGN PATENTS
249,642 4/1926 Great Britain................ 180/1

Primary Examiner—A. Harry Levy
Attorney—Flynn & Frishauf

ABSTRACT: A high pressure pump, such as a gear pump or small piston pump, is connected by means of a clutch to be driven by the engine; a collapsible water bag, of thermoplastic material and capable of holding in the order of 8 to 10 gallons of water, is located in the car, for example in the trunk space; a thin flexible tubing is spooled on a reel, located in the car (for example under the hood), and hydraulic interconnections are provided to take water from the water bag through the pump and to the tubing, so that a self-contained car washing system is provided capable of applying a water stream under pressure. When not in use, the plastic water bag is collapsed, and can fold flat against the inner wall of the trunk.

PATENTED AUG 17 1971 3,599,869
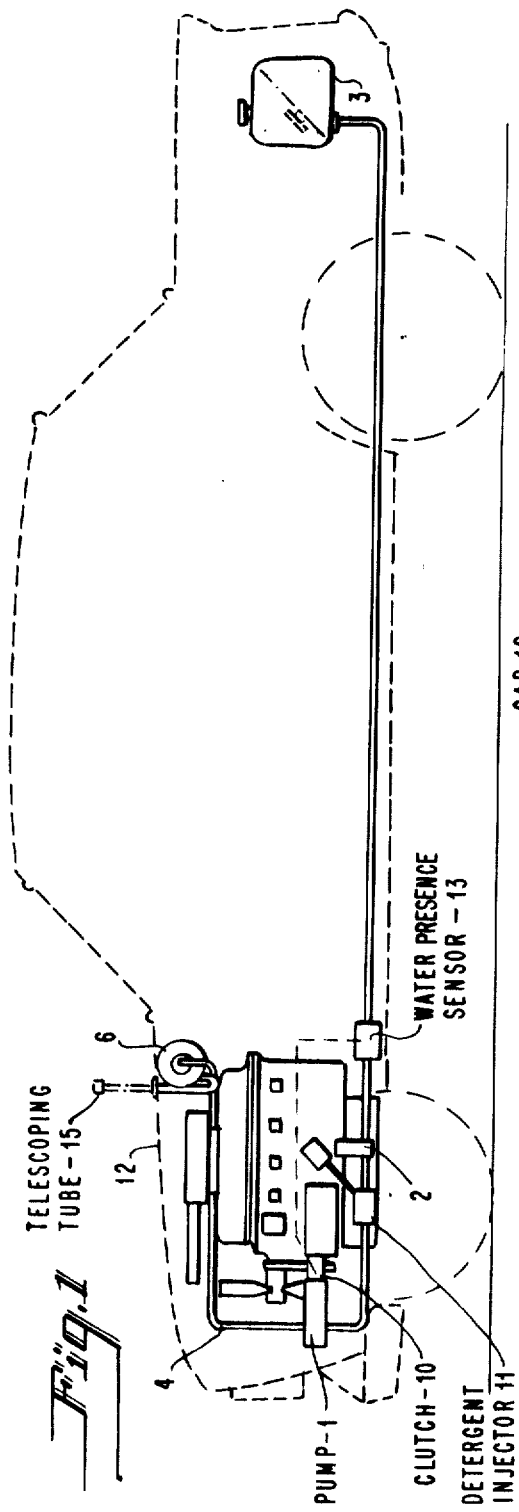
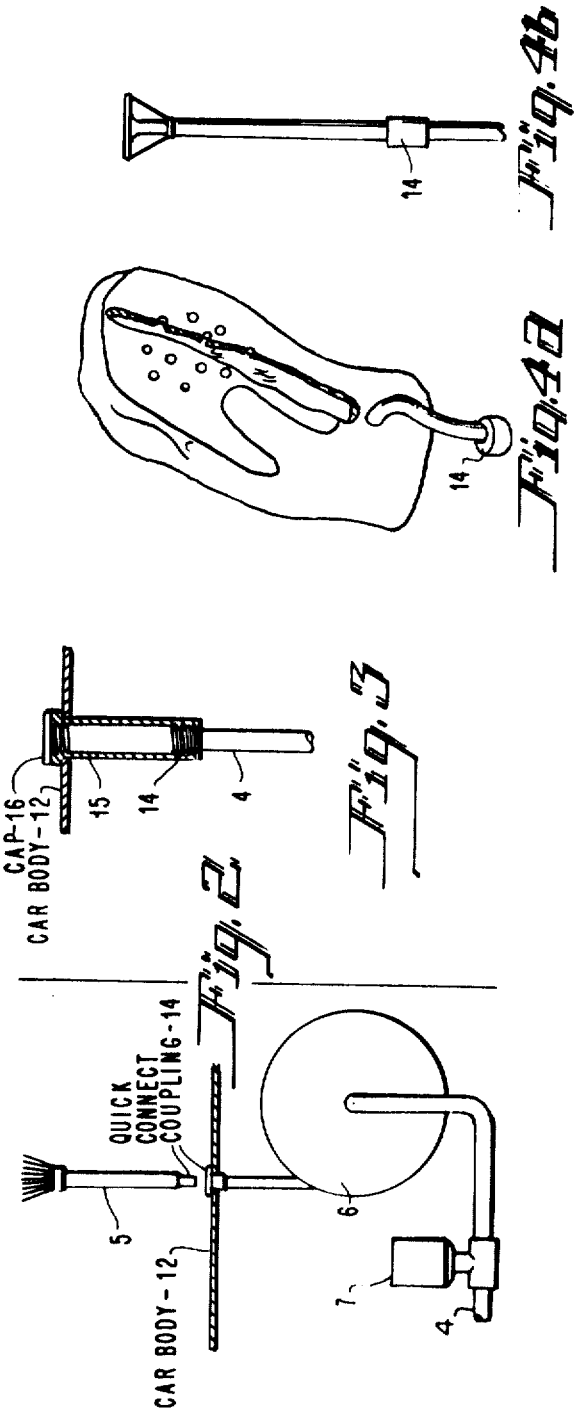
GUIDO OBERDORFER
INVENTOR
BY Rhyne & Trickey
ATTORNEY

CAR WASHING APPARATUS ADAPTED FOR MOUNTING ON THE VEHICLE TO BE WASHED

The present invention relates to a car washing apparatus and more particularly to a car washing apparatus in which water is delivered from a water tank, under pressure, to a hose, to be applied under pressure to the car to be washed, so as to dislodge accumulated dirt.

Unless the owner of a car has access to water under pressure the only way he could clean a vehicle himself is by means of a bucket and sponge; it is, however, frequently desired to provide water under pressure, so as to dislodge encrusted dirt and road film by the pressure of the stream itself. It has been proposed to put water under pressure by utilizing the air pressure in the spare tire; this pressure is sufficient in order to supply water to a washing mitten. It is not sufficient, however, in order to provide a stream having sufficient pressure which can clean a car itself.

It is an object of the present invention to provide car washing apparatus which is self-contained and adapted to be carried on the vehicle to be washed, and which provides water under sufficiently high pressure that dirt can be dislodged therefrom; and which could carry its own water supply so as to be independent of service stations and other public places, where washing may be prohibited, while being so constructed that no useful passenger, or trunk space is taken up by the equipment.

SUBJECT MATTER OF THE PRESENT INVENTION

Briefly, a pressure pump such as, for example a gear pump, is mounted to be driven by the engine, when idling, for example over a clutch which can be coupled by an electric switch or which can be engaged by a Bowden cable. Thin tubing, for example plastic tubing of ½ to 1 cm. internal diameter is connected to the pump. Water supply is obtained from a water container, preferably a plastic bag of about eight to ten gallons capacity, which is arranged to be foldable, when empty, against the inner wall of the vehicle, for example in the trunk. The pump delivers water under high pressure, to the tubing, which can be unreeled, and connectable at the end to a spray head, or a nozzle. The nozzle is preferably so constructed that it provides a flattened, fan-shaped stream of water, under high pressure. If desired, a water softening arrangement can be interposed in the hydraulic lines, and injection devices to inject a detergent or other washing compounds can be likewise inserted in the hydraulic lines.

The pump is preferably a gear pump, delivering high output pressures in the order of from 300 to 600 p.s.i., plastic tubing in the order of 5 to 10 mm. diameter can then adequately carry the water under such high pressure, and provide a sharp, intense jet for complete cleaning, and dislodging of dirt.

The invention will be described by way of example with reference to the accompanying drawings, wherein:

FIG. 1 is a general schematic view of the washing arrangement in a passenger car;

FIG. 2 is a partly exploded view of details of the apparatus;

FIG. 3 is a side view partly in section, of a telescoping connecting tube;

FIG. 4a is an illustration of a washing mitten with a quick-coupling connection; and FIG. 4b is an illustration of a flattened nozzle to provide a fan-shaped stream.

A high pressure pump 1, preferably a gear pump, or a small piston pump, is located in the engine compartment of the vehicle, driven by a V-belt, for example from the fly wheel of the engine. The V-belt drives a clutch 10, engageable by electromagnetic means, or by Bowden cable (not shown) to connect driving power from the engine to pump 1. A water tank 3 is located in the vehicle, for example in the trunk of the car. It is connected by means of a pipe to a water-presence sensor 13, then to a water softening device 2, then to a detergent or cleaning substance injection unit 11, and then to the suction side of the pump. The pressure side of the pump connects to a pressure line 4 which may be rigid, or flexible, and from which water under pressure can be taken off. Line 4 may terminate in a quick-release coupling 14, connected flush with the outside of the car body. A flexible hose, which can be carried on a reel 6, and which has a mating quick-release coupling attached, can then be connected to coupling 14; the other end of the hose again has a quick release coupling to which a washing mitten (FIG. 4a) or a nozzle (4b) can be attached; of course, other washing devices, such as brushes or the like, may be used, as well as spray tubes such as tube 5 (FIG. 2). Line 4 may also terminate in a telescoping, extendable pipe 15 (FIG. 3), passing through a wall of the body of the car and ordinarily closed by means of a cap 16. Extending telescoping tube 15 beyond the car prevents accidental damage to the car finish by the hose reel, or other washing apparatus.

Reel 6, on which the hose is spooled, is preferably mounted directly on the fire wall of the vehicle, and provided with holding means and clamps so that the hose cannot unwind during vibration or operation of the vehicle. As an alternative, the line 4 can be directly connected to reel 6 by means of a rotatable coupling as seen in FIG. 2 which, when placed under pressure, is self-sealing and self-holding, the coupling being movable only upon release of pressure.

If the line 4 is brought out directly to a quick release coupling at the edge of the body of the vehicle, see FIG. 2, then the body is additionally formed with a hole large enough to pass both ends of the hose on reel therethrough, one end to be connected to the terminal of line 4, and the other to be pulled out as desired. When not in use, a movable plate can cover the opening.

The pressure pump 1 is preferably a gear pump providing an output pressure of from 300 to 600 p.s.i., and so arranged that the amount of water being supplied is adjustable, depending upon whether the user connects a jet nozzle, or a washing mitten or the like. Small piston pumps can also be used; for such a construction, a water pressure equalization chamber 7 (FIG. 2) is preferably included at the pressure side of the pump.

Water presence sensor 13 provides an indication if the water supply should fail, and disconnects pump 1 by disengaging clutch 10 upon failure of water supply. As an additional safety measure, a drainage plug is preferably provided at the lowest point of the system to drain water and prevent freezing during winter. The water softening device 2 is preferably an ion exchange apparatus, well known in the art, which prevents mineral deposits on the painted surface of the vehicle body and increases effectiveness of detergents.

The water tank 3 is of plastic, which is flexible and so arranged that, when empty, it can fold flat against the wall of the body, for example within the trunk. The tank 3, when full, is preferably cube-shaped, and foldable on the sidewalls, along diagonal lines indicated in broken lines in FIG. 1, so that the thickness of the tank, when empty, is only that of several thicknesses of plastic material. The location of the tank can be anywhere in the vehicle, as desired by the user, the trunk being suitable. It has been found, surprisingly, that a tank capacity of about eight gallons is sufficient for washing of an ordinary vehicle, although of course larger tanks may be sued.

The hose, to be stored on reel 6, may be of plastic and of an internal diameter of from 5 to 10 mm. A flat nozzle, as illustrated particularly in FIG. 4b, which provides a sharp flat jet of water at the pressure of 600 p.s.i. enables peeling off even of encrusted dirt from a smooth laquer surface of an automobile, with minimum water use so that a small tank of the above-given capacity is sufficient. The hose reel may, of course, be located at any other convenient place in the vehicle, for example also in the trunk. It may be provided with a spring-self-return so that the hose is ordinarily under slight tension thus preventing entanglement with the vehicle during use.

Detergents or other cleaning substances may be introduced into tank 3 before use of the washing device; alternatively, an injector, well-known by itself and indicated schematically at 11, may be used. Such injectors may be filled with suitable washing compounds, or with cartridges proportioned for the quantity of water to be used. The injector, of course, may also be located in the pressure line 4 if desired.

Although not shown in the drawings, it is desirable to provide a T-fitting in the suction line, so that washing water can be sucked up by the pump not only from tank 3, but also from other sources of water such as buckets to be located next to the vehicle.

Various changes in the arrangement may be provided; the hydraulic lines interconnecting the various elements may be located on the vehicle at any desired point, may be fixed or flexible, arranged to be built in or added later as attachments. The supervisory control of the car washing attachment is not shown in detail since it is well known in the art, the safety control line from water-presence sensor 13 to the clutch 10 being indicated by dashed lines.

I claim:

1. In a car washing apparatus adapted to be mounted on a vehicle to be washed having a pressure pump, the improvement comprising said pressure pump being a high pressure pump (1) providing a pressure in the range of about 300—600 p.s.i. connectable to be driven by the vehicle engine;

a foldable water container (3) of flexible plastic material and having a capacity in the order of 8—10 U.S. gallons adapted to hold water for washing the vehicle and foldable flat when empty;

a washing hose;

a nozzle means connected to the washing hose and having an outlet providing a high pressure stream;

reel means for storing said hose located in the engine compartment of the vehicle;

and hydraulic interconnection means from said water container to said pump and to said hose to conduct wash water from container to the nozzle means under said pressure of between 300—600 p.s.i. when the pump is driven by the engine of the vehicle.

2. Apparatus according to claim 1 wherein said hose has an inside diameter in the order of from ½ to 1 cm.

3. Apparatus according to claim 1 wherein said nozzle means is shaped to deliver a flat fan-out jet of water.

4. Apparatus according to claim 1 wherein said water container is mounted against a sidewall of the vehicle, and foldable against said side wall when empty.

5. Apparatus according to claim 1 including a water-presence detection device sensing absence of water, and means interrupting driving power to said pump upon said sensed absence to prevent damage to the pump when the tank is dry.